US006604929B2

(12) United States Patent
Hawley et al.

(10) Patent No.: US 6,604,929 B2
(45) Date of Patent: Aug. 12, 2003

(54) FIBER CUTTING MECHANISM

(75) Inventors: Ronald C. Hawley, Winona, MN (US); Craig N. Hansen, New Hope, MN (US); Paul C. Cross, Shorewood, MN (US)

(73) Assignee: Woodshed Technologies, Inc., Winona, MN (US)

( * ) Notice: Subject to any disclaimer, the term of this patent is extended or adjusted under 35 U.S.C. 154(b) by 0 days.

(21) Appl. No.: 09/933,281

(22) Filed: Aug. 20, 2001

(65) Prior Publication Data

US 2002/0044987 A1 Apr. 18, 2002

Related U.S. Application Data

(63) Continuation-in-part of application No. 09/766,355, filed on Jan. 19, 2001, and a continuation-in-part of application No. 09/491,925, filed on Jan. 27, 2000.

(51) Int. Cl.$^7$ .............................................. B28B 11/12
(52) U.S. Cl. ...................... 425/313; 425/113; 425/311; 83/200
(58) Field of Search ................................ 425/313, 311, 425/113, 256–261, 447–449; 83/200; 206/148

(56) References Cited

U.S. PATENT DOCUMENTS

| | | | | |
|---|---|---|---|---|
| 3,752,614 A | * | 8/1973 | Bremer | 425/113 |
| 3,760,673 A | | 9/1973 | Peterson, Jr. | |
| 4,616,989 A | * | 10/1986 | Mewes et al. | 425/203 |
| 4,708,623 A | * | 11/1987 | Aoki et al. | 425/203 |
| 4,728,275 A | | 3/1988 | DiLullo et al. | |
| 5,110,275 A | * | 5/1992 | Scheuring | 425/113 |
| 5,165,941 A | * | 11/1992 | Hawley | 425/148 |
| 5,185,117 A | * | 2/1993 | Hawley | 425/205 |
| 5,191,819 A | | 3/1993 | Hoshi | |
| 5,474,036 A | * | 12/1995 | Hansen et al. | 123/80 BB |
| 5,658,601 A | | 8/1997 | Hoshi | |
| 5,873,941 A | * | 2/1999 | Milliman | 425/113 |
| 5,989,009 A | * | 11/1999 | Matsuo | 425/313 |
| 6,186,769 B1 | * | 2/2001 | Hawley | 427/434.7 |
| 6,241,498 B1 | * | 6/2001 | Hansen et al. | 418/206.5 |
| 6,247,389 B1 | | 6/2001 | Samuels et al. | |
| 6,431,847 B1 | * | 8/2002 | Hawley et al. | 425/113 |

* cited by examiner

Primary Examiner—Allan N. Shoap
Assistant Examiner—Jason Prone
(74) Attorney, Agent, or Firm—Moore, Hansen & Sumner

(57) ABSTRACT

A cutting mechanism for cutting fibers entrained within a viscous flow is herein disclosed. The present invention is typically part of a system for preparing fiber reinforced molding materials that comprises a viscous entrainment compounding device for compounding a continuous strand of reinforcing fiber with a molding material in a predetermined ratio. The entrained fibers are conveyed to the cutting mechanism which cuts the continuous strand of reinforcing fibers into predetermined lengths and conveys the fiber reinforced molding material to an output device. The cutting mechanism itself comprises a housing having a bore with an inlet and an outlet and a bed knife disposed therein. The bed knife has an inlet channel formed therethrough that is aligned with the gullets of a rotating cutter such that the gullets of the rotating cutter are rotated past the inlet channel of the bed knife in substantial alignment therewith. Fibers entrained within the molding material flow into the gullets of the rotating cutter and are cut to a predetermined length and then conveyed to an output device.

17 Claims, 8 Drawing Sheets

FIBER CUTTING MECHANISM

CROSS REFERENCE TO RELATED APPLICATIONS

This application is a Continuation-in-Part of U.S. application Ser. No. 09/491,925 of Ronald C. Hawley filed Jan. 27, 2000 entitled Direct Compounding of Fibers and Resins for Molding Operations and U.S. application Ser. No. 09/766,355 of Ronald C. Hawley, Craig N. Hansen, and Paul C. Cross, filed on Jan. 19, 2001 and entitled Resin and Fiber Compounding Apparatus for Molding Operations. These applications are hereby incorporated by reference.

FIELD OF THE INVENTION

The present invention relates to a mechanism for cutting fibers that are to be used as a reinforcing material in a molding compound. More specifically, the present invention relates to a rotary cutter for adjustably cutting fibers entrained within a flowing resin material.

BACKGROUND OF THE INVENTION

U.S. patent application Ser. Nos. 09/491,925 and 09/766,355, incorporated by reference above, disclose a device and method for producing a fiber-reinforced resin molding compound that may be introduced directly to a molding device or machine. In the compounding process set forth in the aforementioned patent applications, a strand or strands of a reinforcing fiber, preferably a glass fiber, is entrained within a flow of molten resin in a predetermined weight percent or volume ratio. The fibers are cut into predetermined lengths after having been entrained within the flowing, molten resin. Two devices or methods for cutting the reinforcing fibers are disclosed in the aforementioned patents.

A first method for cutting the reinforcing fibers takes advantage of the cutting action of an extruder auger flight against the bore within which it is housed. In this method, the entrained reinforcing fiber is directed into an injector or feed extruder. As the entrained reinforcing fibers are fed into the injector or extruder, the tight working fit between the auger flights and their housing acts to cut the reinforcing fibers. While simple and relatively wear resistant, this method does not provide a reliable means for cutting the fibers to repeatable lengths.

Another mechanism comprising a reciprocating blade is also disclosed in the aforementioned patents. This mechanism comprises a housing having a bore formed therethrough for the passage of the fiber/resin compound and a blade that is positioned across the bore of the housing bore. The blade has at least one aperture formed therethrough. As the blade is caused to reciprocate, the aperture formed through the blade is periodically brought into alignment with the bore formed through the housing. When the aperture is aligned with the housing bore, the fiber/resin mixture may pass therethrough. But, because the blade is reciprocating in such a manner as to withdraw the aperture out of alignment with the bore formed through the housing, the relatively sharp edge of the aperture will cut the reinforcing strands entrained within the flowing, molten resin as the edge of the aperture is withdrawn past the wall of the housing bore. The length into which the strands of reinforcing fiber are cut is controlled by altering the frequency at which the blade reciprocates. Again, this device is relatively simple, however, any wear to the blade will rapidly degrade the cutting efficiency of the device. In addition, this type of cutting device produces an unnecessary resistance to the flow of the molten resins and entrained fibers during the period when the housing bore is covered by the blade.

OBJECTS OF THE INVENTION

Accordingly, there is a need for a cutting mechanism that has a minimal resistance to flow of molten resin and entrained fiber and that operates in a continuous manner.

Another object of the present invention is to provide a cutting mechanism that is adjustable to permit close control over the lengths into which the reinforcing fiber strands are to be cut.

Yet another object of the present invention is to provide a cutting mechanism whose performance will not be significantly degraded by normal wear. Coincidental with this object is the object of providing a cutting mechanism that is modular and easily maintained.

These and other objectives and advantages of the invention will appear more fully from the following description, made in conjunction with the accompanying drawings wherein like reference characters refer to the same or similar parts throughout the several views.

SUMMARY OF THE INVENTION

The objects of the invention are met in a cutting mechanism that is capable of cutting fibers that are already entrained in a viscous material such as a thermoplastic resin. The cutting mechanism essentially comprises a housing having a bore formed therein, a bed knife disposed within the bore in the housing, and a rotating cutter. The housing has an inlet and an outlet. Reinforcing fibers entrained within a viscous molding material enters the housing through its inlet and passes through the inlet channel of the bed knife, the bed knife being arranged within the bore of the housing such that the inlet channel of the bed knife is substantially aligned with the inlet of the housing. The rotating cutter has a plurality of gullets formed therethrough around its periphery. The gullets may take many different shapes but are located on the rotating cutter such that as the cutter rotates with respect to the bed knife, the gullets are rotated past the inlet channel formed through the bed knife. In this manner, the reinforcing fibers and the molding materials in which they are entrained pass into the gullets and are subsequently severed.

Preferably the rotating cutter will remain in substantially full facial contact with the bed knife, but in general, misalignments of up to three thousandths of an inch may occur without degrading the cutting efficiency of the cutting mechanism. In order to maintain the necessary alignment of the rotating cutter and bed knife, it is desirable to provide a biasing structure for biasing the rotating cutter into substantially full facial contact with the bed knife. The biasing structure comprises a biasing rod that is constructed and arranged to resiliently apply pressure to the rotary cutter in a direction that is substantially normal to the surface of the bed knife. The biasing mechanism may also comprises a mechanical stop that prevents the movement of the biasing rod away from the bed knife. In this manner the movement of the rotary cutter away from the bed knife may be limited to no more than three thousandths of an inch as indicated.

The gullets of the rotating cutter of the cutting mechanism may comprise any number of shapes and arrangements. However, a preferred embodiment comprises a number of cylindrical bores formed through the rotating cutter. The bores have a leading edge and a trailing edge, the trailing edge being sufficiently sharp to sever a fiber protruding from the inlet passage of the bed knife into the gullet of the rotating cutter. The cylindrical bores may be formed normal to the planar cutting surface of the rotating cutter or may be inclined with respect to the cutting surface of the cutter. The gullets may also comprise a series of cutouts formed into the outer edge of the rotating cutter. The cutouts also have a leading edge and a trailing edge, with the trailing edge being formed so as to sever a fiber protruding from the inlet passage of the bed knife into the gullet of the rotating cutter. As with the cylindrical bores, the cutouts may be formed normal to the planar cutting surface of the rotating cutter or may be inclined with respect to the cutting surface of the cutter.

The present invention may also be characterized as a system for preparing fiber reinforced molding materials. This system comprises a viscous entrainment compounding device for compounding a continuous strand of reinforcing fiber with a molding material in a predetermined ratio and a cutting mechanism that is constructed and arranged to cut the continuous strand of reinforcing fibers into predetermined lengths. The viscous entrainment compounding device is constructed and arranged to convey the compounded continuous strand of reinforcing fiber and molding material to the cutting mechanism which, after cutting the fiber, conveys the fiber reinforced molding material to an output device that may be one of many different devices, including an injection molding press, conveying device, or preform fabricator.

A preferred cutting mechanism comprises a housing having a bore with an inlet and an outlet formed therein, a bed knife disposed within the bore in the housing, and a rotating cutter. The bed knife has an inlet channel formed therethrough that is arranged within the bore of the housing such that the inlet channel of the bed knife is substantially aligned with the inlet of the housing. The rotating cutter has formed entirely therethrough a number of gullets. These gullets are located on the rotating cutter such that as the cutter rotates with respect to the bed knife, the gullets are rotated past the inlet channel formed through the bed knife in substantial alignment therewith. Preferably the viscous entrainment compounding device will convey the continuous strand of reinforcing fiber therethrough by means of viscous shear forces imparted to the reinforcing fiber by molding materials being conveyed through the viscous entrainment compounding device under pressure.

Yet another characterization of the present invention is as a cutting mechanism for cutting fibers entrained in a viscous material that comprises a housing having a cavity with an inlet and an outlet formed therein; a bed knife having an inlet substantially aligned with that of the housing and a substantially planar cutting surface arranged to face the interior of the cavity; and, a rotating cutter supported upon and rotated by a pilot shaft, the rotating cutter having a substantially planar cutting face that is in substantially full facial contact with the cutting surface of the bed knife, the rotating cutter further having a plurality of gullets formed therethrough in substantial alignment with the inlets of the housing and the bed knife so that the fibers entrained in the viscous material may be received therethrough, the gullets each having a trailing edge that is constructed and arranged to sever the fiber as the trailing edge of the gullet passes the inlet of the bed knife, the resulting mixture of cut fibers and viscous material passing from the cavity of the cutting mechanism through the outlet of the housing.

The cutting mechanism may also comprise a backflow auger that is also received over the pilot shaft. The backflow auger is disposed within the cavity of the housing and is spaced away from the rotating cutter to define therebetween an annular passage into which the mixture of cut fibers and viscous materials may flow. The mixture of cut fibers and viscous materials then exits the housing through its outlet, which is in fluidic communication with the annular chamber. The back flow auger has grooves formed in its sides that act in conjunction with the walls of the cavity to prevent substantially all of the mixture of cut fibers and viscous materials from exiting the annular passage except through the outlet of the cavity formed through the housing.

A sealing collar received over the pilot shaft between the backflow auger and the rotating cutter forms respective seals between the backflow auger and the sealing collar and between the sealing collar and the rotating cutter so as to prevent substantially all contact between the mixture of cut fibers and viscous materials and the pilot shaft.

A biasing mechanism for resiliently biasing the rotating cutter into substantially full facial contact with the bed knife is preferably also part of the present invention. The biasing mechanism typically comprises a biasing rod that is passed through a longitudinal bore formed completely through the pilot shaft. A distal end of the biasing rod contacts the rear surface of the rotating cutter so as to force the cutter into contact with the bed knife. The biasing forces exerted upon the biasing rod derive from a spring mechanism that may be coupled to a base end of the biasing rod. Where appropriate, a mechanical limiting mechanism may be coupled to the biasing rod so as to prevent the rotating cutter from moving more than approximately three-one thousandths of an inch away from the bed knife.

A drive mechanism is coupled to the housing of the cutting mechanism for the provision of motive power to the rotating cutter. The drive mechanism comprises a motor that is operatively coupled to a drive shaft by a transmission mechanism. The drive shaft is in turn coupled to the pilot shaft of the cutting mechanism for rotating the rotating cutter with respect to the bed knife. Due to the high heat required where the cutting mechanism is used in conjunction with thermoplastic resins, it is preferable to couple the drive mechanism of the present invention to the cutting mechanism in a thermally isolated manner.

DETAILED DESCRIPTION

Figure 1:
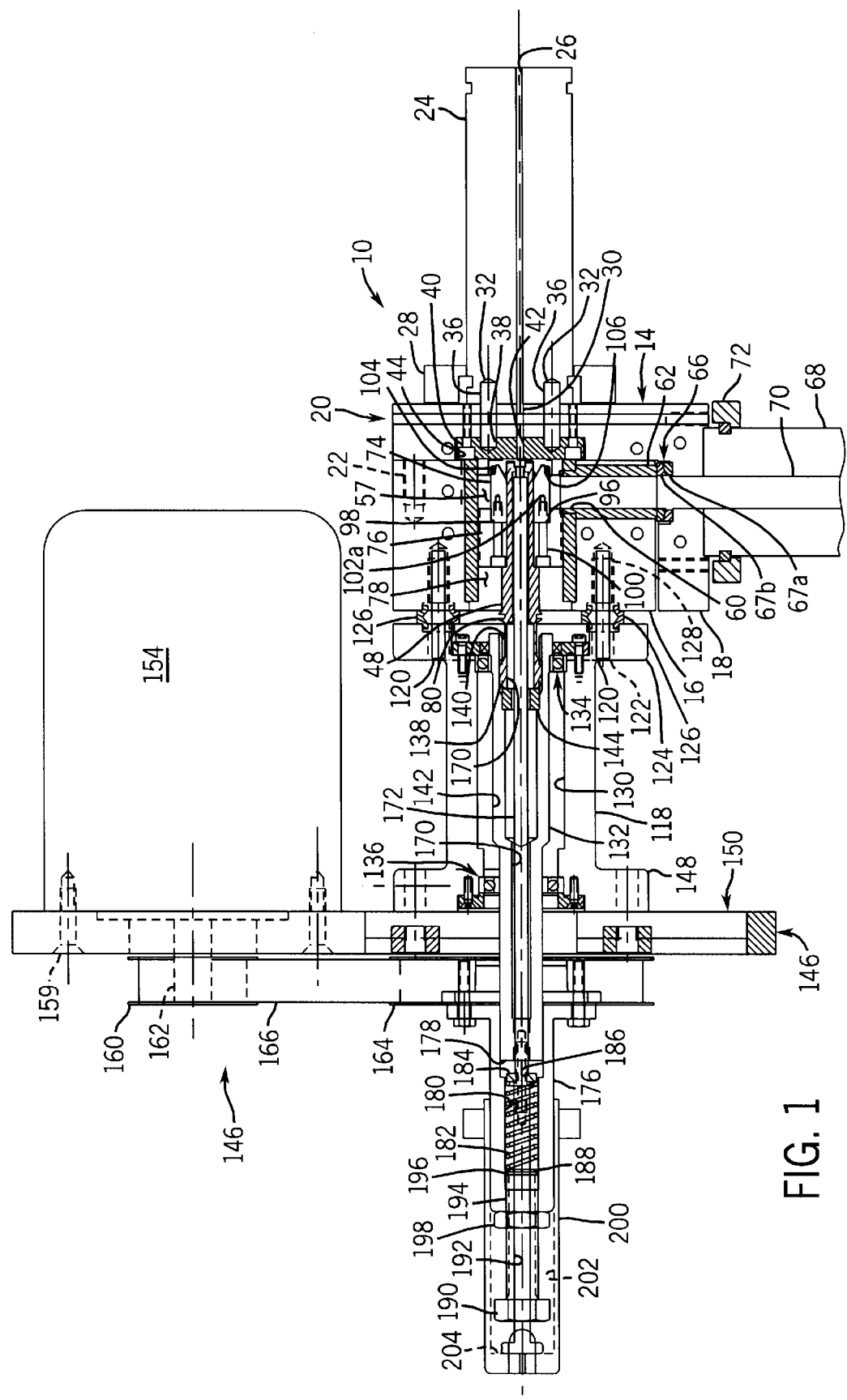
FIG. 1 is a cross-sectional side elevation of the cutting mechanism of the present invention.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The cutting mechanism 10 of the present invention is constructed and arranged to receive therein reinforcing fibers that are entrained within a flow of a viscous molding material, cut the reinforcing fibers to a predetermined length, and pass the admixture of molding material and cut reinforcing fibers to an output device which may comprise a conveying device such as an extruder or an injector for a molding operation. In order to maintain the entrained reinforcing fibers within a controlled flow path, the cutting operation implemented by the cutting mechanism 10 of the present invention takes place within a housing 14 that comprises a body 16 and an angle plate 18. In order to withstand the extremes of pressure, heat, and rough use, the housing 14 is typically constructed of machined aluminum or steel. In order to gain access to the interior of the housing and to the operative parts of the cutting mechanism 10, the housing 14 is hinged such that the body 16 may be rotated away from the angle plate 18 about pivot or hinge axis 20. Alternatively, body 16 can remain stationary and the angle plate 18 may be caused to pivot. Preferably the angle plate 18 is secured in its closed position by one or more bolts 22 that are used to secure the angle plate 18 to the body 16.

Reinforcing fibers are entrained within a compounding device such as that disclosed in U.S. patent Ser. Nos. 09/491,925 and 09/766,355, incorporated by reference above. Of these compounding devices, only a traction block 24 having a passage 26 formed therethrough is illustrated. The traction block is secured to the angle plate 18 of the housing 14 using a coupling collar 28 that is in turn secured to the angle plate 18 by a number of bolts (not shown). The traction block 24 is aligned with and secured to the angle plate 18 of the housing 14 in such a manner that passage 26 is substantially aligned with an inlet passage 30 formed through the angle plate 18. In order to insure the alignment of the passage 26 with the inlet passage 30, a plurality of dowel pins 32 extending through bores 34 formed through the angle plate 18 are inserted into bores 36 formed in the traction block 24. The dowel pins 32 positively align the passage 26 of the traction block 24 with the inlet passage 30 of the angle plate 18. Preferably the dowel pins 32 will extend entirely through the angle plate 18 and into bores 38 formed into the bed knife 40. The dowel pins 32 align the bed knife 40 in such a manner that the inlet passage 30 formed through the angle plate 18 is substantially aligned with an inlet passage 42 of the bed knife 40. Bolts 44 secure the bed knife 40 to the angle plate 18 in the described alignment.

Figure 2:
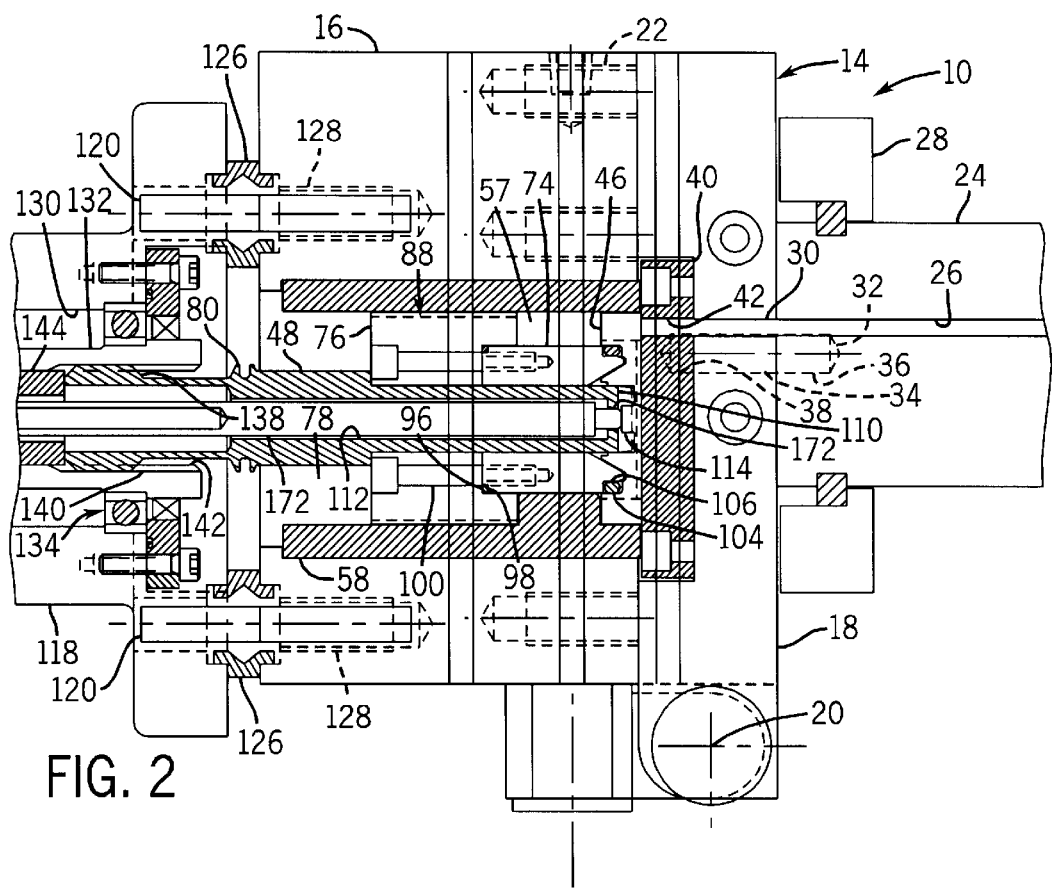
FIG. 2 is a cross-sectional top view of the cutting mechanism illustrated in FIG. 1.
Figure 3:
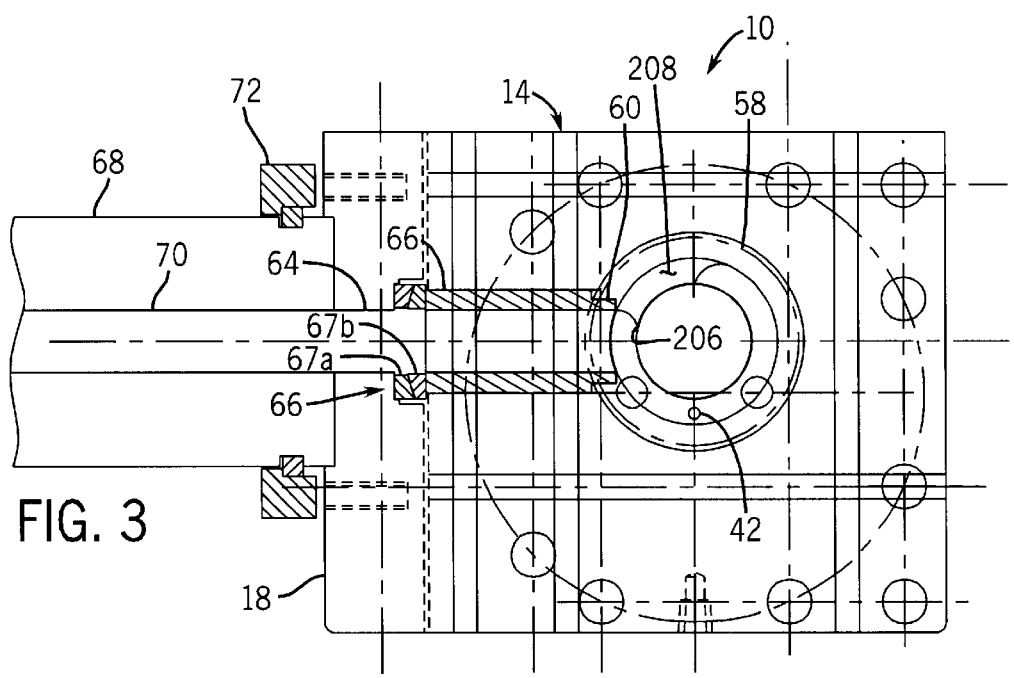
FIG. 3 is a cross-sectional end view of the cutting mechanism illustrated in FIG. 1.

Entrained reinforcing fibers moving at a known rate of speed pass through the passage 26 in the traction block 24 and enter the cutting mechanism 10 through inlet passages 30, 42. As the entrained reinforcing fibers exit the inlet passage 42 of the bed knife 40, the reinforcing fibers are cut by a rotating cutter 46. The rotating cutter is illustrated in FIGS. 1 and 2 in its operative position within the cutting mechanism 10.

Figure 4A:
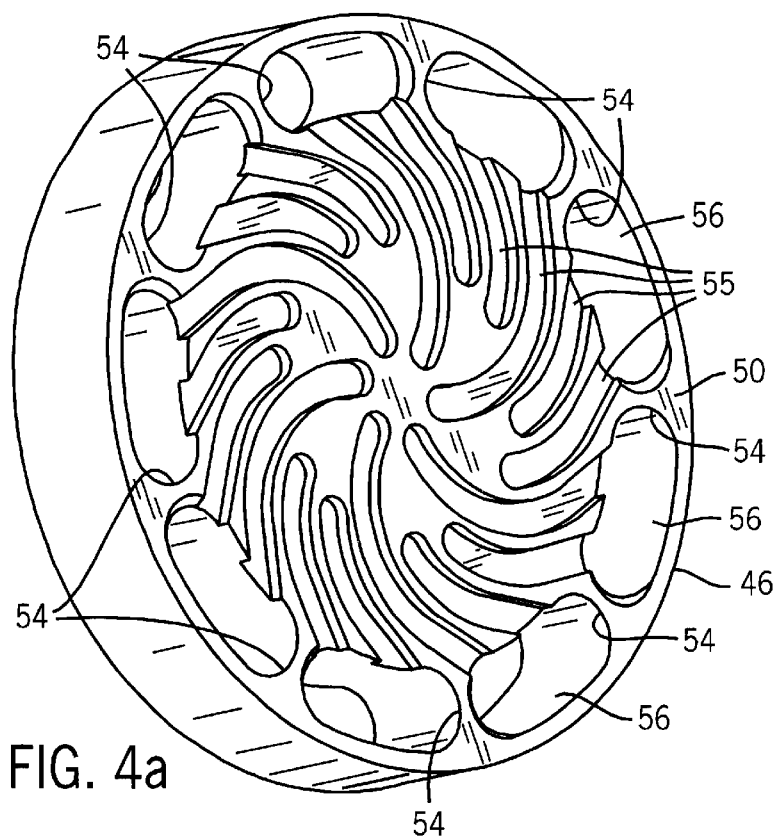
FIGS. 4a, 4b and 4c are perspective views of rotary cutters constructed and arranged according to the present invention.
Figure 4B:
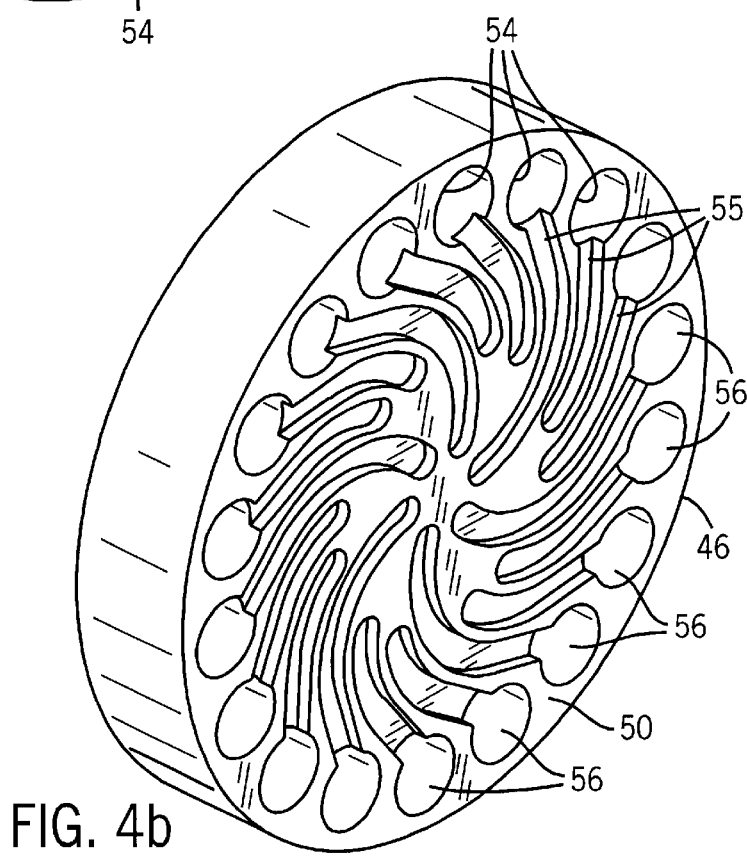
Figure 4C:
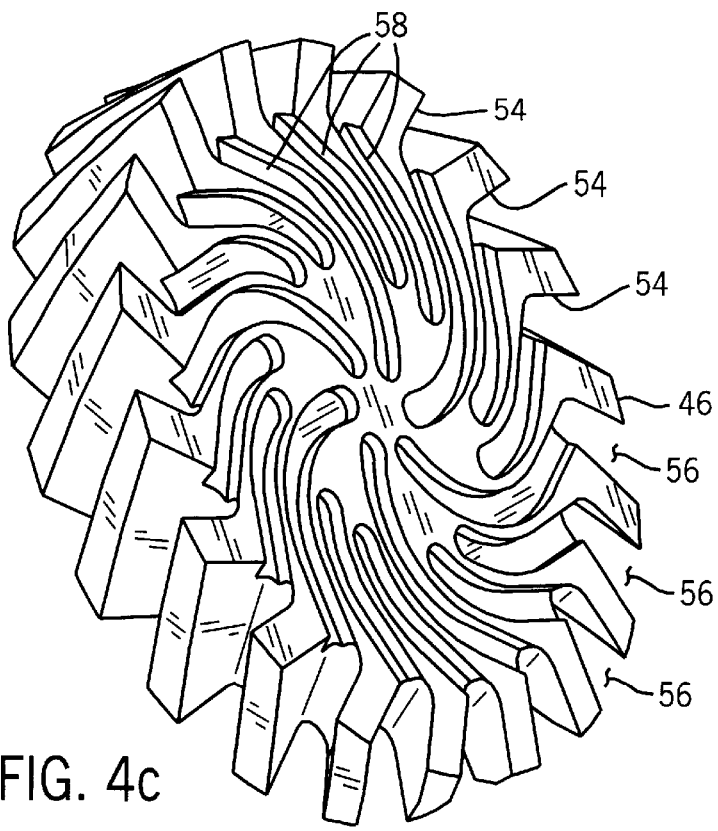
Figure 5:
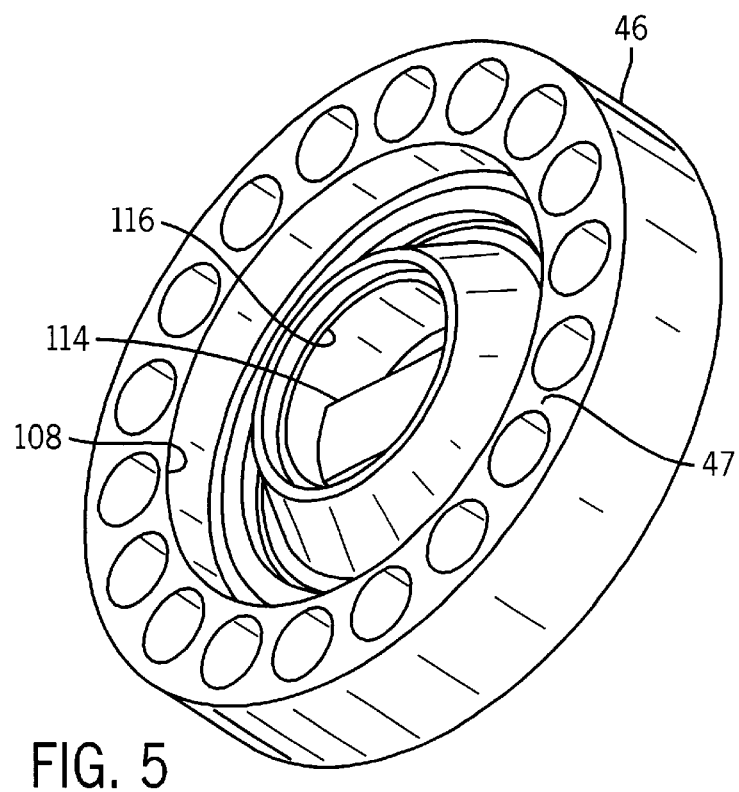
FIG. 5 is a perspective view of the underside of the rotary cutter illustrated in FIG. 4b.
Figure 6:
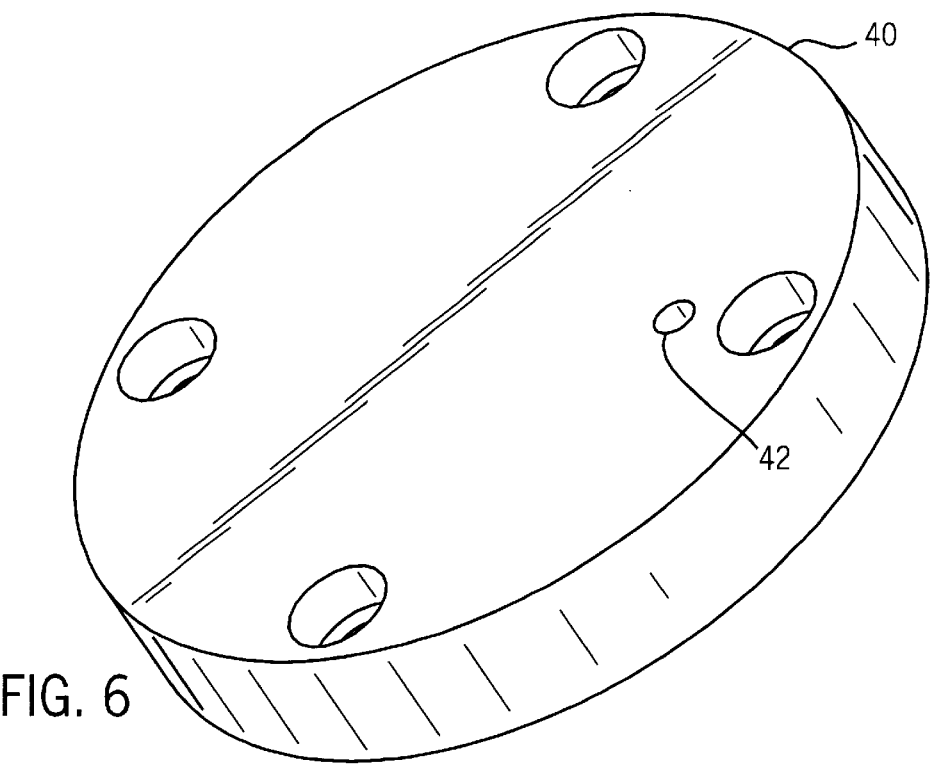
FIG. 6 is a perspective view of the bed knife of the present invention.

FIGS. 4a, 4b, and 4c illustrate various embodiments of the rotating cutter 46 while FIG. 5 illustrates the backside of a preferred embodiment of a rotating cutter 46. The rotating cutter 46 is supported and caused to rotate by a pilot shaft 48. The cutting surface 50 of the rotating cutter 46 is, during operation, positioned in a substantially parallel relationship with the bed knife 40. Preferably the cutting surface 50 of the rotating cutter 46 will be in substantially complete surface contact with the bed knife 40 as it rotates in relation thereto. However substantially complete surface contact between the bed knife 40 and the rotating cutter 46 is not required. The alignment of the cutting surface 50 and the bed knife 40 is dependent upon the nature of the fibers being cut by the cutter 46 and may vary from application to application. It is contemplated that the distance between the rotating cutter 46 and the bed knife 40 may be as great as ten thousandths of an inch in some applications, though the distance between the cutter and bed knife will generally not exceed this distance. A more preferred range of distances between the cutter 46 and the bed knife 40 is between one and three thousandths of an inch.

Each of the rotating cutters 46 comprises a plurality of cutting edges 54 that are arranged around the perimeter of the rotating cutter 46. These cutting edges are aligned with the position of the inlet passage 42 of the bed knife 40 such that as the rotating cutter 46 is rotated by the pilot shaft 48, the cutting edges 54 of the rotating cutter 46 will be moved past the inlet passage 42 so as to cut the fibers. Note that different types of fibers are cut in different manners. Glass fibers have a tendency to fracture when subjected to shearing forces and other, tougher and less brittle fibers must be cut in a scissors- or knife-like manner. For example, glass fibers may easily be cut by a cutter 46 having relatively blunt cutting edges 54 whereas natural fibers such as jute or hemp or man-made fibers such as KEVLAR™ require relatively sharp and well defined cutting surfaces 54.

Immediately forward of the cutting edges 54 relative to the direction of the rotation of the rotating cutter 46, there exists a gullet or bore 56 formed entirely through the rotating cutter 46. The gullets or bores 56 define the cutting edges and are formed through the rotating cutter 46 so as to align the cutting edges 54 with the inlet passage 42 formed through the bed knife. As the gullets or bores 56 are brought into alignment with the inlet passage 42 of the bed knife 40, a predetermined length of reinforcing fiber and the viscous resins in which they are entrained enters the gullets or bores 56. As the gullets or bores 56 are rotated out of alignment with the inlet passage 42 of the bed knife 40, the cutting edge 54 formed at the trailing edge of the gullet or bore 56 acts in concert with the sharp edge of the inlet passage 40 to shear off or cut the entrained reinforcing fibers. The length to which the reinforcing fibers are cut by the rotating cutter 46 is modified by controlling the rate at which the entrained reinforcing fibers enter the cutting mechanism 10 in relation to the rate at which the rotating cutter 46 rotates. Specifically, the longer the gullets or bores 56 of the rotating cutter 46 are in alignment with the inlet passage 42 of the bed knife 40, the more entrained reinforcing fiber may pass into the gullet or bore 56 of the cutter 46. Similarly, for a given period of alignment between the inlet passage 42 and the gullet 56, larger quantities of the entrained reinforcing fiber will be able to pass into the gullets 56 where the entrained reinforcing fibers are moving at a higher rate of speed, and conversely, where the entrained reinforcing fibers are moving at a lower rate of speed, relatively shorter lengths of entrained reinforcing fiber will be able to enter into the gullet 56 of the rotating cutter 46. Preferably the leading edges of each of the gullets 56 will comprise a chamfer or groove that extends forward along the cutting face 50 of the rotating cutter 46 to a position adjacent the cutting edge 54 of the gullet 56 immediately forward of the indicated gullet 56. In this manner, there will be a flow path presented to the inlet passage 42 of the bed knife 40 at all times, i.e. either the groove formed into the leading edge of the gullets 56, the gullet 56 itself, or both, will be presented to the inlet passage 42 to permit continuous flow of the resin and fiber into the cutting mechanism. This arrangement also has the benefit of preventing the buildup of pressure or blockage of flow in the traction block preceding the cutting mechanism of the present invention.

In one embodiment, the gullets 56 of the rotating cutter 46 will be inclined in the direction of rotation of the cutter 46. With this configuration, the gullets 56 of the cutter 46 will act in a pump-like manner and cause the admixture of resins and cut fibers to flow through and past the cutter 46, thereby improving the flow of the resin and fibers through the cutting mechanism 10. The admixture of cut fiber and resin flows through the rotating cutter 46 and into an annular space 57 formed between the sleeve 58 and a sealing collar 74 that is received over the pilot shaft 48 beneath the rotating cutter 46.

Other embodiments of the gullets 56 include cylindrical bores, oblong bores or slots, curved or rectilinear cutouts formed into the edge of the rotating cutter 46 and any other shape that suitably defines a cutting edge 54 and a flow passage through the cutter 46. Note that the gullets 56 may be angled into or away from the direction of travel and may be rectilinear or curved in their passage through the rotating cutter 46.

As can be appreciated, the vast majority of the reinforcing fiber and the viscous resins within which they are entrained pass into the cutting mechanism 10 through the gullets 56 formed through the rotating cutter 46. However, because the resins and reinforcing fibers are under high pressures ranging from 1,000 to 10,000 PSI, it is often the case that some resins may enter between the substantially planar face of the bed knife 40 and the cutting surface 50 of the rotating cutter 46. When this occurs, these resins or reinforcing fibers can force the rotating cutter 46 away from the bed knife 40. Some small amount of misalignment between the cutting surface 50 of the rotating cutter 46 and the planar surface of the bed knife 40 can be tolerated without a loss in cutting efficiency. However, in order to ensure that all of the reinforcing fibers are cut cleanly and reliably, the cutting surface 50 of the rotating cutter 46 is preferably within three thousandths of an inch out of alignment with the surface of the bed knife 40. Therefore, in order to remove any resins or reinforcing fibers that might work their way between the cutting surface 50 of the rotating cutter 46 and the bed knife 40, the cutting surface 50 of the rotating cutter 46 is provided with a plurality of grooves 55. The flow channels created by the grooves 58 are formed in a scroll pattern that curves back from the direction of rotation of the cutter 46. Viscous shear forces acting upon any of the fiber/resin admixture present between the cutter 46 and the bed knife 40 cause the admixture to flow through grooves 58 back into the gullets 56 formed in the cutter 46, thereby continuously clearing the admixture from between the cutter 46 and bed knife 40.

The rotating cutter 46 is supported upon the pilot shaft 48 within a sleeve 58 that is disposed within the housing 14. In a preferred embodiment, the sleeve 58 is of a substantially cylindrical shape, having open top and bottom ends, and an outlet passage 60 formed through a side thereof. The admixture of cut reinforcing fibers and viscous resins that is passed through the gullets 56 of the rotating cutter 46 flows into the sleeve 58 and exit therefrom through the outlet passage 60. Typically, an outlet sleeve 62 will extend from the outlet passage 60 of the sleeve 58 and will direct the admixture of cut reinforcing fibers and viscous resins from the sleeve 58 to an outlet passage 64 formed through the angle plate 18. Because the angle plate 18 is hinged as described above, it is preferred to provide a self-adjusting seal mechanism 66 such as that illustrated in FIG. 1. Ring 67a is connected to the angle plate 18. Ring 67b is sealingly affixed to the end of the outlet sleeve 62. The sealing rings 67a and 67b of the sealing structure 66 are preferably rigid and fashioned of a sturdy material such as steel though they may be made of a resilient material. In any case, the sealing rings 67a and 67b are substantially heat resistant and impervious to the resins flowing through the cutting mechanism 10. The spherical mating faces of the sealing rings 67a and 67b easily account for any misalignment between the angle plate 18 and the body 16 of the housing 14. The admixture of cut reinforcing fibers and viscous resins exits the cutting mechanism 10 through the outlet passage 64 formed through the angle plate 18. An outlet nipple 68 having a passage 70 formed therethrough is coupled to the angle plate 18 by a coupling collar 72 that is bolted to the angle plate in a known fashion. The channel 70 formed through the outlet nipple 68 is arranged in substantial alignment with the outlet passage 64 formed through the angle plate 18 and the passage defined by the outlet sleeve 62. The outlet nipple 68 may take any necessary shape or form and may be connected to any suitable downstream conveying device or molding machine.

Figure 9:
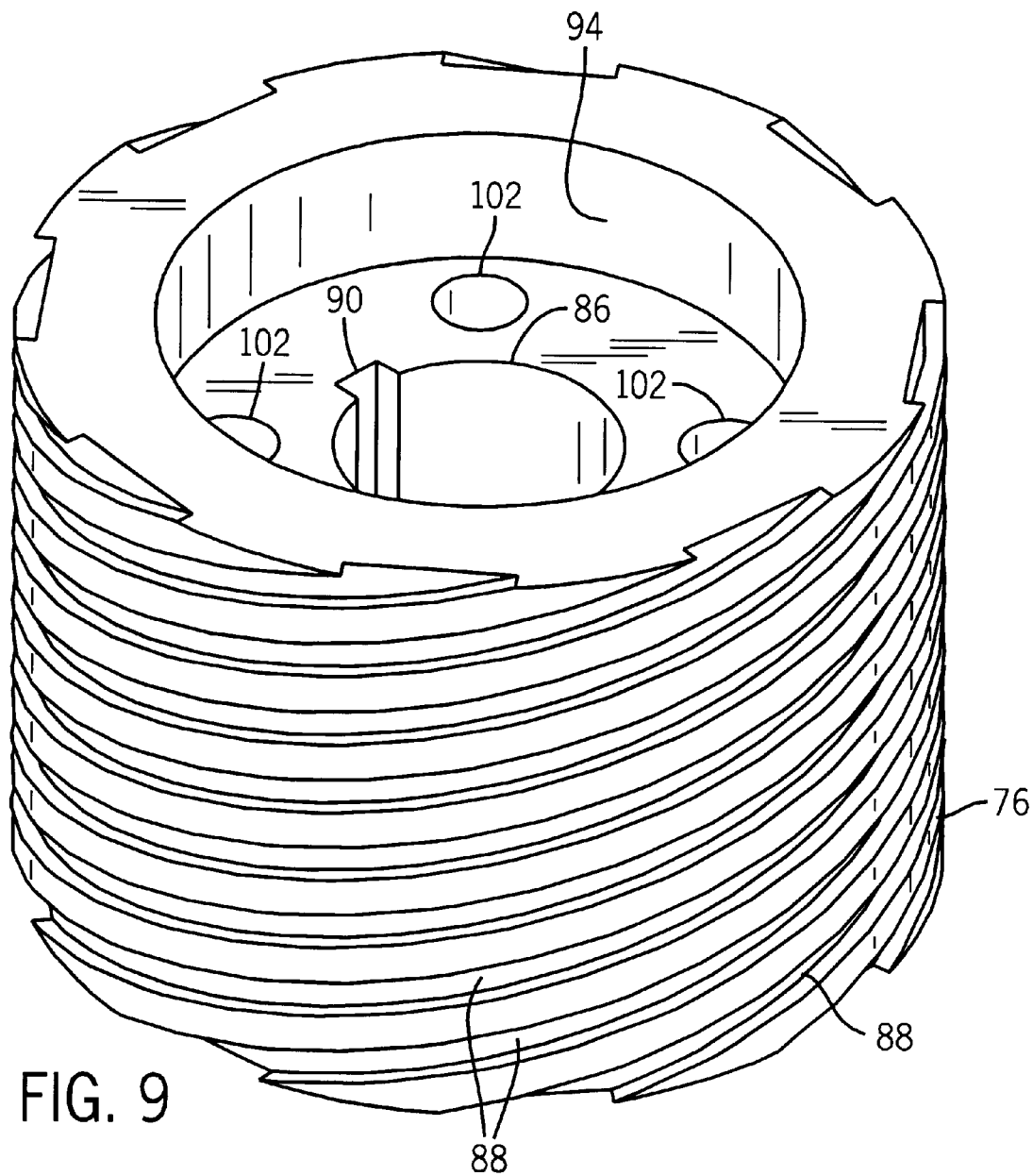
FIG. 9 is a perspective view of one embodiment of the anti-backflow auger of the cutting mechanism of the present invention.

In order to ensure that the admixture of resins and cut reinforcing fibers flow out of the sleeve 58, the pilot shaft 48 has received thereover a sealing collar 74 and a backflow auger 76. Pilot shaft 48 has a shoulder or ridge 80 formed therearound near its base. Pilot shaft 48 has an additional shoulder 84 formed therearound that is defined by a narrowing in the diameter of the pilot shaft 48. The backflow auger 76 has a bore 86 formed therethrough that allows the backflow auger 76 to be received over the pilot shaft 48 such that the bottom surface of the backflow auger 76 abuts against the shoulder 84. The backflow auger 76 has a plurality of helical grooves 88 formed into the exterior surface thereof. The helical grooves 88 are arranged such that as the auger 76 is rotated with respect to the sleeve 58, any resin and/or cut reinforcing fiber that has worked its way between the auger 76 and the sleeve 58 will be directed back towards an annular passage 57 bounded by the sleeve 58, the sealing collar 74, the rotating cutter 46 and the backflow auger 76. In order to ensure that the backflow auger 76 rotates with the pilot shaft 48, it is preferred to couple the backflow auger 76 directly to the pilot shaft 48 using a standard key structure of known type and function. A keyway 90 formed in the bore 86 of the backflow auger 76 can be seen in FIG. 9. Any of the fiber/resin admixture that makes its way past the backflow auger 76 will accumulate in cavity 78. Cavity 78 is preferably open to the atmosphere and can readily be cleaned out, however, it is conceivable that an additional bushing may be constructed and arranged to fill the cavity 78, to thereby provide an additional seal between the annular cavity and the exterior of the cutting mechanism 10.

In order to prevent the ingress of resin between the pilot shaft 48 and the bore 86 formed through the backflow auger 76, a sealing collar 74 having a bore 92 formed therethrough is received over the pilot shaft 48 and coupled directly to the backflow auger 76. A shallow bore 94 formed into an end of the backflow auger 76 nearest the rotating cutter and concentrically with the bore 86 formed entirely through the backflow auger 76 receives an end of the sealing collar 74 as illustrated in FIG. 1. Preferably a heat resistant sealing ring 96 will be emplaced within the shallow bore 94 between the sealing collar 74 and the backflow auger 76. Sealing ring 96 is preferably received within a small channel 98 formed around the base of the sealing collar 74. Preferably, the sealing collar 74 will be securely coupled to the backflow auger 76. This is most advantageously accomplished by passing a plurality of bolts 100 through the same number of bores 102 formed longitudinally through the backflow auger 76 and into corresponding bores 102a formed in the sealing collar 74. In this manner, the sealing collar 74 will be constrained to rotate with the backflow auger 76 which is keyed to the pilot shaft 48 as indicated above. A seal 104 is received in a channel 106 formed around an edge of the sealing collar 74. The aforementioned edge of the sealing collar 74 is received within a complementary annular channel 108 formed into the backside 47 of the rotating cutter 46. Ideally, the seal 104 positioned between the sealing collar 74 and the annular channel 108 in the rotary cutter 46 will prevent the ingress of the viscous resins flowing through the cutting mechanism 10 from entering between the sealing collar 74 and cutter 46.

The admixture of chopped reinforcing fibers and resinous molding materials that has passed into the annular passage 57 formed between the sleeve 58 and the sealing collar 74 will easily pass from the cutting mechanism 10 through the outlet passages 60 and 64 formed through the outlet sleeve 62 and outlet nipple 68. However, it is desirable to avoid any stagnation of the flowing admixture in certain portions of the aforementioned annular chamber 57. Therefore, in one alternate embodiment, the sleeve 58 is provided with a scraper 206 that acts to deflect the admixture of reinforcing fibers and resinous molding materials from the spinning sealing collar 74 into passage 60 formed through the side of the sleeve 58. The scraper 206 is essentially the leading edge of a ridge or projection 208 that extends around the interior surface of the sleeve 58 in such a manner as to limit the size of the annular chamber 57 formed between the sleeve 58 and the sealing collar 74. This in turn prevents the stagnation of the admixture of reinforcing fibers and molding materials within the annular chamber.

Figure 7:
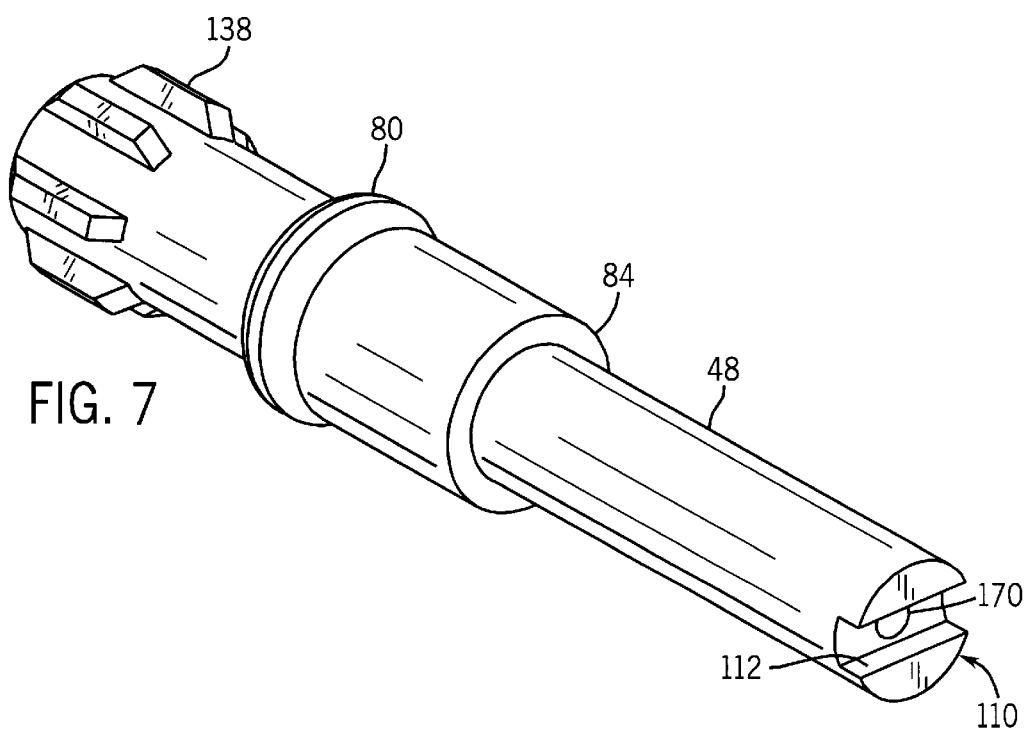
FIG. 7 is a perspective view of the pilot shaft of the cutting mechanism.
Figure 8:
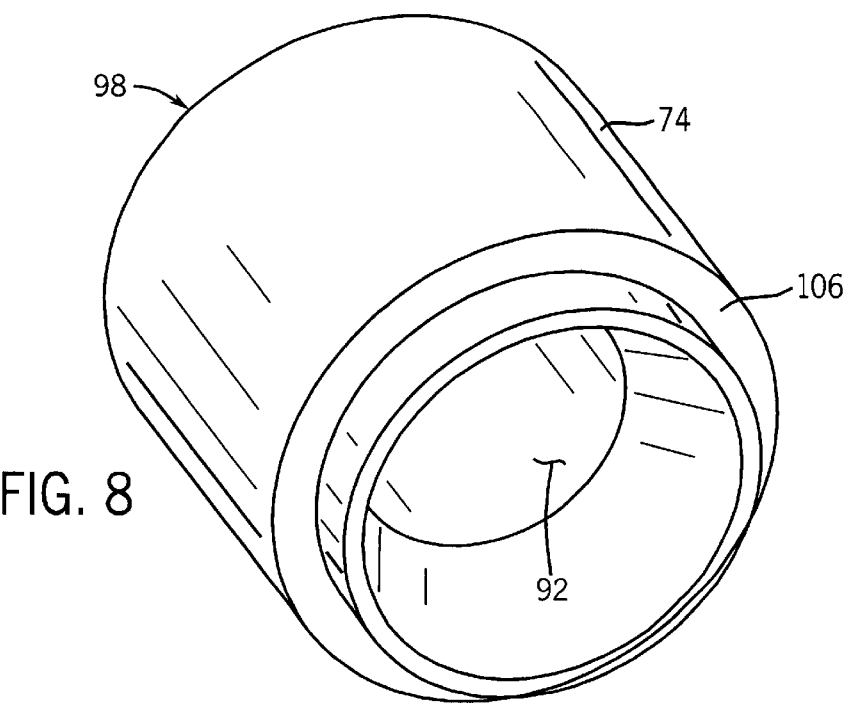
FIG. 8 is a perspective view of the sealing collar of the cutting mechanism of the present invention.
Figure 10:
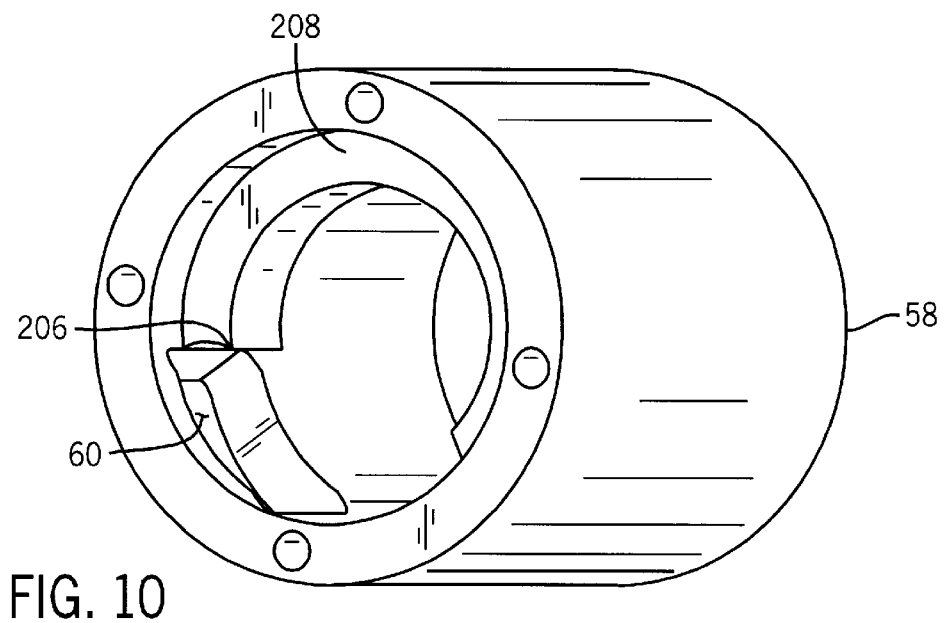
FIG. 10 is a perspective view of the sleeve of the cutting mechanism of the present invention; and, FIG. 11 is a plan view of the motor mount of the present invention.

As can be appreciated from FIG. 7, the tip 110 of the pilot shaft 48 has a channel 112 formed therethrough. This channel is constructed and arranged to receive therein a tab 114 that is extends from the bottom of a stopped bore 116 formed in the center of the backside 47 of the cutter 46. The tip 110 of the pilot shaft 48 and the tab 114 mate in such a manner that rotary motion of the pilot shaft 48 is imparted directly to the cutter 46. The fit between the tab 114 and the channel 112 of the pilot shaft 46 is somewhat loose and allows the cutter 46 to be rotated out of perpendicular relation with the pilot shaft 48 so as to account for any misalignment in the plane of rotation of the cutter 46 with respect to the face of the bed knife 40.

The housing 14 of the cutting mechanism 10 is separated from the drive components of the cutting mechanism so as to prevent damage thereto due to contamination of the viscous resins flowing through the cutting mechanism 10 and from the relatively high temperatures to which the cutting mechanism 10 is routinely exposed. Accordingly, a bearing housing 118 is coupled to the housing 14 in spaced apart relation therewith by a plurality of bolts 120 that are passed through bores 122 formed through a flange 124 of the bearing housing 118. The bolts 120 pass through spacers 126 positioned between the housing 14 and the flange 124 of the bearing housing 118 and into bores 128 formed into the body 16 of the housing 14. The airspace between the bearing housing 118 and the housing 14 and the insulative nature of the spacers 126 act to thermally isolate the bearing housing and the remaining drive components of the cutting mechanism 10 from the housing 14 thereof. The spacers 126 are constructed and arranged to minimize the conduction of thermal energy therethrough as are the bolts 120 and the pilot shaft 48. Bolts 120 are preferably hollow so as to limit the conduction of thermal energy therethrough and the pilot shaft 48 has a bore formed therethrough that is larger than the required dimensions to limit thermal conduction. The airspace between the housing 14 and the bearing housing 118 not only limits thermal conduction, but also permits the clearance of any resinous material that may have accumulated in cavity.

Bearing housing 118 has a bore 130 formed entirely therethrough. Bore 130 is sized to receive therein a drive shaft 132 that is rotatably mounted in a pair of bearing assemblies 134 and 136. The bearing assemblies 134, 136 are of a sealed type to prevent the entry of any contaminants such as molding compound or dirt from entering into the bore 130 of the bearing housing 118. Motive power is transferred from the drive shaft 132 to the pilot shaft 48 via a spline connection formed between the male splines 138 at the exterior of the end of the pilot shaft 48 opposite the cutter 46 and the complementary female spline section 140 formed in a portion of a longitudinal interior stepped bore 142 formed entirely through the drive shaft 132. A bushing 144 received within the female spline section limits the entry of the male spline section 138 of the pilot shaft 48 into the female spline section 140.

Figure 11:
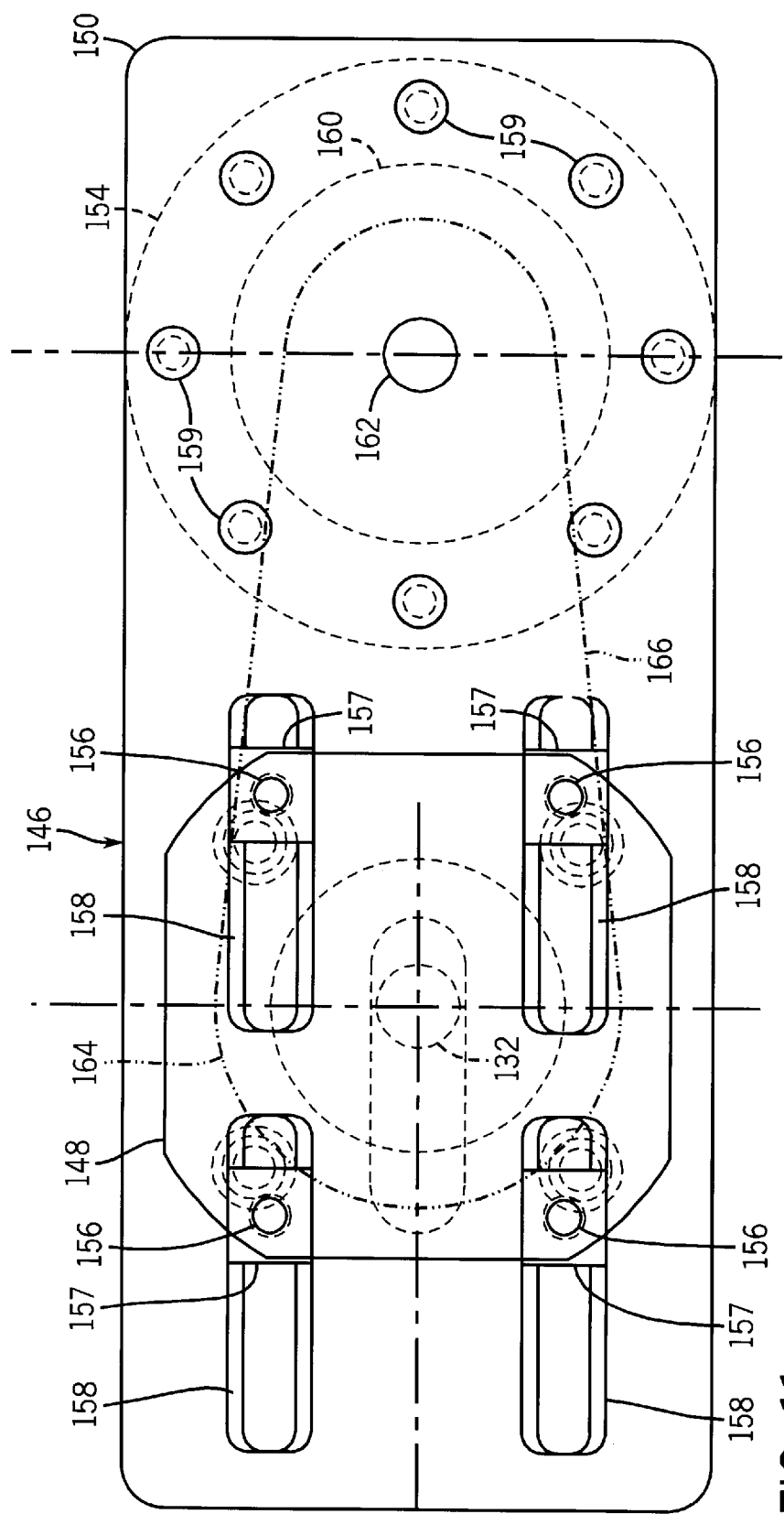

FIGS. 1 and 11 illustrate how the motor mount structure 146 is secured to the flange 148 of the bearing housing 118. Motor mount structure 146 comprises a plate 150 that is secured to a flange 148 of bearing housing 118 by means of bolts 156. The plate 150 extends laterally from the bearing housing 118 a sufficient distance to permit the mounting of the motor 154 thereto. Motor 154 is bolted to plate 150 using bolts 159. The heads 157 of bolts 156 (or a washer or similar structure where suitable) are received in slots or channels 158, thereby permitting the plate 150 to move relative to the bearing housing 118. In slidably mounting the motor mount structure 146 to the flange 148 of the bearing housing 118, the distance between a pulley 160 coupled to a drive shaft 162 of the motor may be modified by moving the motor toward and away from a pulley 164 coupled to an end of the drive shaft 132 that extends through the plate 150. In this manner, a drive belt 166 received over the pulleys 160 and 164 may be properly tensioned by moving the motor 154 and pulley 160 away from the bearing housing 118 and tightening the bolts 156 to secure the motor 154 in a desired location with respect to the pulley 164. Motive, rotary power generated by the motor 154 is transmitted through the drive shaft 162 thereof to pulley 160. Subsequently, drive belt 166 passed around pulleys 160 and 164 causes the drive shaft 132 to rotate with pulley 164 secured thereto. This rotary motion is transmitted by the drive shaft 132 to the pilot shaft 48 through the spline connection therebetween. In turn, the pilot shaft 48 rotates the cutter 46 captured between the tip 110 of the pilot shaft 48 and the bed knife 40. In this manner, as the reinforcing fibers entrained within the flow of resins enter into the cutting mechanism 10, the rotary action of the rotary cutter 46 against the bed knife 40 acts to shear off the reinforcing fibers as they extend from the inlet passage 42 of the bed knife 40 and into the gullets 56 of the rotating cutter 46.

As indicated above, it is desirable to maintain the rotating cutter 46 in close contact with the bed knife 40. In order to accomplish this, an adjusting mechanism 168 for biasing the rotary cutter 46 into contact with the bed knife 40 may be coupled to the pulley 164 of the motor mount structure 146 or, alternatively, to the drive shaft 132. Where the cutting mechanism 10 is to include an adjustment mechanism 168, both the drive shaft 132 and the pilot shaft 48 will have formed entirely therethrough a bore 170 that is constructed and arranged so as to permit a biasing rod 172 to be passed therethrough. A distal end 174 of the biasing rod 172 will therefore contact the tab 114 that engages the tip 110 of the pilot shaft 48. Pressure exerted on the tab 114 of the rotary cutter 46 forces the rotary cutter into substantially full facial contact with the bed knife 40 or at least maintains the relative positions of the rotary cutter 46 and bed knife 40 within a preferred maximum allowed offset distance of less than three thousandths of an inch, though it is to be understood that in certain applications, this offset distance may be exceeded. Biasing pressure is exerted upon the biasing rod 172 by resilient or mechanical means or by a combination thereof. Because other means of applying biasing pressure to the biasing rod 172 are envisioned, the present invention is not to be limited to mechanical and resilient means for applying biasing pressure to the biasing rod 172.

Flanged housing 176 of the adjustment mechanism 168 is secured over a base end 178 of the drive shaft 132. As can be seen in FIG. 1, the flanged housing 176 is secured as by bolts to the pulley 164 that drives the drive shaft 132. The flanged housing 176 has a stepped bore 180 formed entirely therethrough. The stepped bore 180 allows a spring 182 to be received therein. The spring exerts biasing pressure on the biasing rod 172 by means of a flange 184 that is affixed to the biasing rod 172. This flange 184, or an equivalent structure, can form an integral part of the biasing rod 172 or, preferably, the biasing rod can be threaded such as that the biasing rod 172 may be disassembled at the location where the flange 184 is to be affixed to the biasing rod 172. Preferably a small channel 186 constructed and arranged to permit the flange 184 to be received thereon will be formed between the respective threaded portions of the biasing rod 172. Reconnecting the respective rethreaded portions of the biasing rod 172 would therefore secure the flange 184 within its channel 186 in a fixed position with respect to the biasing rod 172. The spring 182 is received over the biasing rod 172 and is captured between the flange 184 and a slidable washer 188 that is also received around the biasing rod 172 within the stepped bore 180 of the flanged housing 176. An adjustment bolt 190 having a bore 192 formed entirely therethrough is threadedly received into a threaded opening 194 that opens onto the interior of the stopped bore 180 of the flanged housing 176. A distal end 196 of the adjustment bolt 190 bears against the washer 188 and acts to adjust the spring tension that may be applied to the biasing rod 172. A locking nut 198 is received around the threaded barrel of the adjustment bolt 190 and may be jammed against the end of the flanged housing 176 to secure the adjustment bolt 190 in a particular position so as to maintain a particular tension upon the biasing rod 172. As can be appreciated, threading the adjustment bolt 190 into the flanged housing 176 compresses the spring 182, thereby applying a larger biasing force to the biasing rod 172 through the flange 184. This biasing force is in turn transmitted to the rotary cutter 46 which is then forced into substantially full facial contact with the bed knife 40. At the very least, biasing pressure applied to the rotating cutter 46 by the biasing rod 172 will be sufficient to maintain the rotary cutter 46 within the preferred allowed cutting distance of three thousandths of an inch or less.

Because of random blockages and the high pressures under which the resin and entrained reinforcing fibers are flowing through the cutting mechanism 10 may occasionally exert large forces upon the rotary cutter 46, upon occasion the rotary cutter 46 may be pushed away from the bed knife 40. Because the biasing rod 172 that maintains the cutter 46 in contact with the bed knife 40 is resiliently biased, higher pressures between the bed knife 40 and rotary cutter 46 may overcome the spring tension applied to the biasing rod 172, and thereby pushing the rotary cutter 46 out of contact with the bed knife 40. Therefore, it is desirable to provide a mechanical limit that prevents the rotary cutter 46 from moving too far away from the bed knife 40. In the embodiment illustrated in FIG. 1, the mechanical limiting device takes the form of a threaded cover 200 that is threadedly received over the flanged housing 176. The threaded cover 200 has an internal bore 202 that is threaded to engage the threaded exterior surface of the flanged housing 176. The bottom 204 of the internal bore 202 of the threaded cover 200 is positioned that such that when the biasing rod 172 is pushed backward away from the bed knife 40, the end of the biasing rod 172 will contact the bottom 204 of the internal bore of the threaded cover 200 so as to prevent the rotary cutter 46 from moving too far away from the bed knife 40. When both the mechanical stop represented by the threaded cover 200 and the resilient biasing mechanism embodied by the spring 182 are used in conjunction with one another, the biasing rod 172 is resiliently biased toward the bed knife 40 in a manner that avoids applying unnecessarily high pressures between the rotating cutter 46 and the bed knife 40 but which also prevents the rotary cutter 46 from moving too far away from the bed knife 40, thereby allowing for efficient cutting of the entrained reinforcing fibers. As indicated above, an alternate embodiment of the biasing mechanism 168 of the present invention may omit the spring biasing structure associated with the biasing rod 172 and may employ only the mechanical stop as embodied in the threaded cover 200.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A cutting mechanism for cutting fibers entrained in a viscous material, the cutting mechanism comprising:
    a housing having a cavity formed therein, the cavity having an inlet and an outlet;
    a bed knife disposed within the cavity of the housing, the bed knife having an inlet channel formed therethrough, the bed knife being arranged within the cavity of the housing such that the inlet channel of the bed knife is substantially aligned with the inlet of the housing; and,
    a rotating cutter, the rotating cutter having formed entirely therethrough a plurality of gullets, the gullets being located on the rotating cutter such that as the cutter rotates with respect to the bed knife, the gullets of the rotating cutter are rotated past the inlet channel of the bed knife in substantial alignment therewith.

2. The cutting mechanism of claim 1 wherein the rotating cutter is in substantially full facial contact with the bed knife.

3. The cutting mechanism of claim 1 wherein the rotating cutter and the bed knife are no more than three thousandths of an inch out of alignment with each other.

4. The cutting mechanism of claim 1 wherein the rotating cutter and the bed knife are between zero and ten thousandths of an inch out of alignment with each other.

5. The cutting mechanism of claim 1 further comprising a biasing structure for biasing the rotating cutter into substantially full facial contact with a face of the bed knife, the biasing structure comprising a biasing rod constructed and arranged to resiliently apply pressure to the rotary cutter in a direction that is substantially normal to the face of the bed knife.

6. The cutting mechanism of claim 5 wherein the biasing structure further comprises a mechanical stop that prevents a displacement of the biasing rod away from the bed knife in such a manner as to limit the movement of the rotary cutter away from the face of bed knife to no more than three thousandths of an inch.

7. The cutting mechanism of claim 1 wherein the gullets of the rotating cutter comprise bores formed through the rotating cutter, the bores having a leading edge and a trailing edge, the trailing edge being sufficiently sharp to shear a fiber protruding from the inlet passage of the bed knife into the gullet of the rotating cutter.

8. The cutting mechanism of claim 1 wherein the gullets of the rotating cutter comprise cutouts that are formed into the edge of the rotating cutter, the cutouts having a leading edge and a trailing edge, the trailing edge being formed so as to shear a fiber protruding from the inlet passage of the bed knife into the gullet of the rotating cutter.

9. The cutting mechanism of claim 1 wherein the gullets of the rotating cutter comprise oblong bores that are formed through the rotating cutter, the cutouts having a leading edge and a trailing edge, the trailing edge being formed so as to shear a fiber protruding from the inlet passage of the bed knife into the gullet of the rotating cutter.

10. A cutting mechanism for cutting fibers entrained in a viscous material, the cutting mechanism comprising:

a housing having a cavity formed therein, the cavity having an inlet and an outlet;

a bed knife having an inlet substantially aligned with that of the housing, the bed knife having a substantially planar cutting surface arranged to face the interior of the cavity;

a rotating cutter supported upon and rotated by a pilot shaft, the rotating cutter having a substantially planar cutting face that is in substantially full facial contact with the cutting surface of the bed knife, the rotating cutter further having a plurality of gullets formed therethrough, the gullets being aligned with the inlets of the housing and the bed knife so as to receive the fibers entrained in the viscous material therethrough, a trailing edge of the gullets constructed and arranged to sever the fiber as the trailing edge of the gullet passes the inlet of the bed knife, a resulting mixture of cut fibers and viscous material passing from the cavity of the cutting mechanism through the outlet of the housing.

11. The cutting mechanism of claim 10 further comprising:

a backflow auger received over the pilot shaft and disposed within the cavity of the housing, the backflow auger being spaced away from the rotating cutter, thereby defining therebetween an annular passage whereby the mixture of cut fibers and viscous materials may flow from the cavity of the housing through the outlet of the housing, the back flow auger having grooves formed in its sides, the grooves acting in conjunction with a wall of the cavity to prevent substantially all of the mixture of cut fibers and viscous materials from exiting the annular passage except through the outlet of the cavity formed through the housing.

12. The cutting mechanism of claim 10 further comprising:

a sealing collar received over the pilot shaft between the backflow auger and the rotating cutter, the sealing collar being constructed and arranged to form respective seals between the backflow auger and the sealing collar and between the sealing collar and the rotating cutter, thereby preventing substantially all contact between the mixture of mixture of cut fibers and viscous materials and the pilot shaft.

13. The cutting mechanism of claim 10 further comprising:

a biasing mechanism for resiliently biasing the rotating cutter into substantially full facial contact with the bed knife.

14. The cutting mechanism of claim 13 wherein the biasing mechanism comprises:

a biasing rod passed through a longitudinal bore formed completely through the pilot shaft, a distal end of the biasing rod contacting a rear surface of the rotating cutter;

a spring mechanism coupled to a base end of the biasing rod for applying a resilient biasing force to the biasing rod so as to maintain the rotating cutter in substantially full facial contact with the bed knife.

15. The cutting mechanism of claim 14 further comprising:

a mechanical limiting mechanism coupled to the biasing rod so as to prevent the rotating cutter from moving more than approximately three-one thousandths of an inch away from the bed knife.

16. The cutting mechanism of claim 12 further comprising:

a drive mechanism coupled to the housing of the cutting mechanism, the drive mechanism comprising a motor that is operatively coupled to a drive shaft by a transmission mechanism, the drive shaft being coupled to the pilot shaft of the cutting mechanism for rotating the rotating cutter with respect to the bed knife.

17. The cutting mechanism of claim 16 wherein the drive mechanism is thermally isolated from their housing of the cutting mechanism.

* * * * *